Oct. 31, 1939.  H. S. INDGE  2,178,448
METHOD AND APPARATUS FOR LAPPING BORES
Filed Feb. 5, 1938

Inventor
HERBERT S. INDGE
Attorney

Patented Oct. 31, 1939

2,178,448

UNITED STATES PATENT OFFICE 2,178,448

METHOD AND APPARATUS FOR LAPPING BORES

Herbert S. Indge, Westboro, Mass., assignor to Norton Company, Worcester, Mass., a corporation of Massachusetts Application February 5, 1938, Serial No. 188,897

7 Claims. (Cl. 51—278)

The invention relates to a method and apparatus for lapping bores.

One object of the invention is to provide a readily controlled apparatus for lapping to within close precision limits. Another object of the invention is to provide an economical and quick method of lapping bores to close precision limits. Another object of the invention is to provide a readily controlled lapping apparatus of the character indicated. Another object of the invention is to facilitate production of articles which for some requirement of engineering have to be lapped to fine precision limits. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

The accompanying drawing, in which is illustrated one of many possible embodiments of the mechanical features of my invention, Figure 1 is a vertical axial sectional view of a lapping apparatus constructed in accordance with the invention, together with a wiring diagram;

Figures 1, 2, 3, 4:
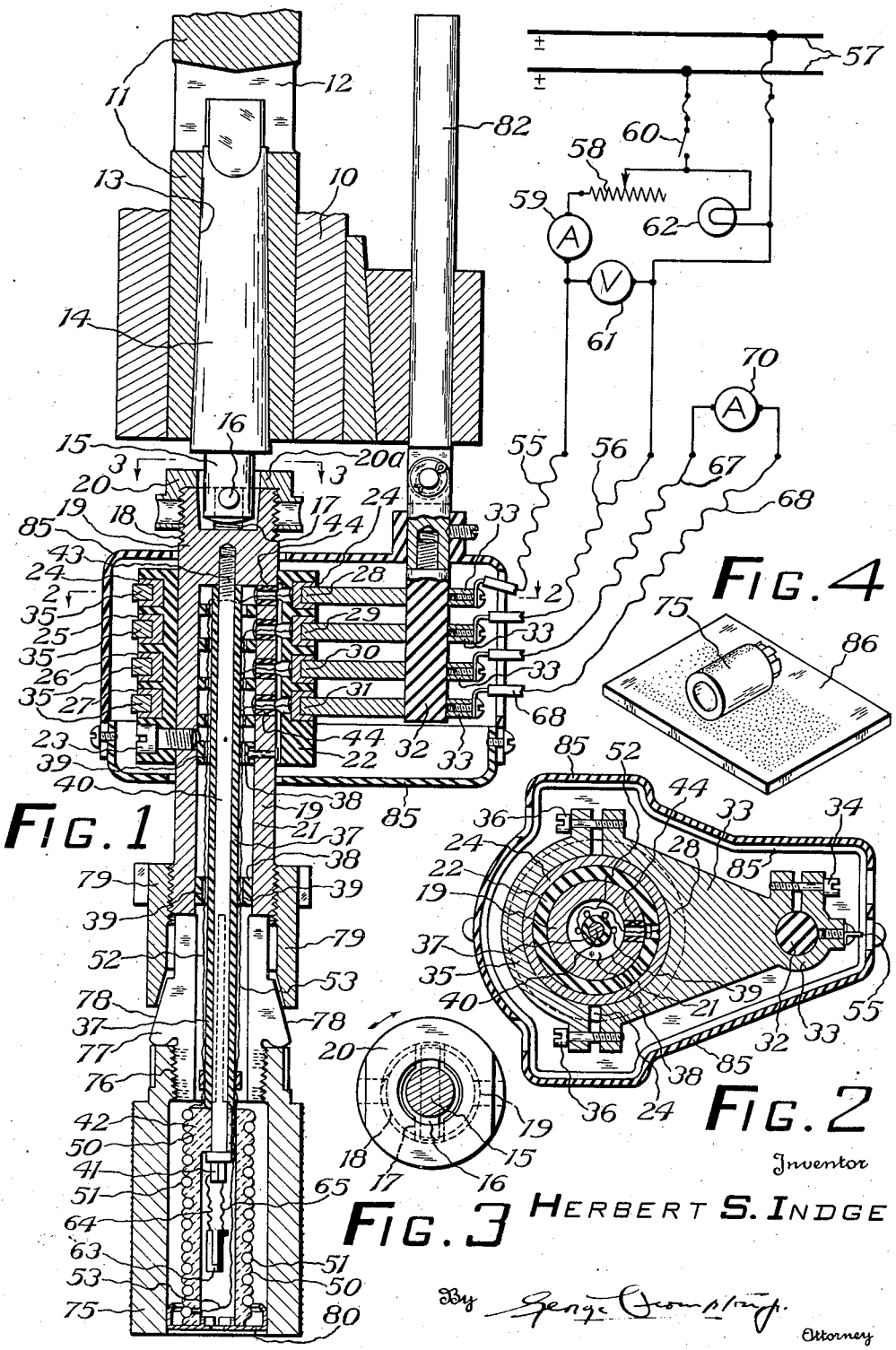
Figure 2 is a horizontal sectional view taken on the line 2—2 of Figure 1.
Figure 3 is a horizontal sectional view taken on the line 3—3 of Figure 1.
Figure 4 is an isometric view of a lap and a charging plate for the charging of the lap.

Referring first to Figure 1, the apparatus of the invention is intended to be applied to a drill press or the like whereby the lapping element may be rotated and manually traversed up and down. The drill press is not shown in detail herein, since any suitable type of drill press may be used. Such drill press may have a relatively stationary sleeve 10 in which is journalled a rotatable hollow spindle 11. An aperture 12 extending through the spindle 11 and intersecting its tapered bore 13 provides access for a wedge, not shown, which may be used to remove the shank 14 of the tool which, while the apparatus is in use, is firmly wedged in the spindle 11.

The bottom of the shank 14 has a reduced portion 15 transversely through which is a pin 16. This pin 16 seats in a slot 17 in a screw threaded end 18 of a spindle 19. A collar 20 with an annular flange 20a is screwed onto the top of the spindle 18 and overlaps the pin 16, thus holding the spindle 19 to the shank 14, allowing universal movement of the lapping tool. This is in order that the lap may align itself in the bore of the article being lapped.

The spindle 19 has an internal bore 21 from the bottom nearly to the top, as shown. Fitted on the spindle 19 is an insulating sleeve 22. This may be securely attached in place by means of a screw 23. The sleeve 22 holds four commutator rings 24, 25, 26 and 27. Four brushes 28, 29, 30 and 31 are in engagement with the rings 24, 25, 26 and 27, respectively, and are fastened to an insulating rod 32. The construction of the brushes may vary widely, one construction being shown in Figure 2, according to which as shown each brush has an outer part 33 which has a bore for the insulating rod 32 and is clamped to it by means of a screw 34. The part 33 has a semi-circular cutout fitting one of the rings 24 to 27 and an outer half bearing portion 35 is attached to the portion 33 by means of screws 36. This arrangement insures a good contact between the brush and the ring at all times and at the same time there may be enough play so that an undue amount of friction will not be developed.

An internal structure for the support of wires is provided in the bore 21. As shown in Figure 1, I provide a long hollow rod of insulating material 37 having a plurality of enlarged portions 38 which fit the bore 21. Small bores 39 are provided through the enlarged portions 38 to permit the passage of wires. The rod 37 is held to the spindle 19 by means of a long metal rod 40 having a head 41 holding a porcelain insulator 42 to the lower end of the rod 37 and having a screw threaded upper end 43 in screw threaded engagement with the spindle 19.

Insulating sleeves 44 are provided in the wall of the spindle 19 so that wires can pass therethrough connecting the rings 24, 25, 26 and 27 to the electric apparatus supported by the spindle 19.

The porcelain insulator 42 has a helical groove 50 in its outer surface in which is located resistance heating wire 51. A conductor wire 52 connects to the top end of the wire 51 and also to the ring 24. A conductor wire 53 connects to the bottom end of the resistance wire 51 and to the ring 27. Referring now to the righthand part of Figure 1 and the wiring diagram, the brushes 28 and 29 are connected to conductors 55 and 56 which are connected to power lines 57. A rheostat 58 may be interposed in the conductor 55 as well as an ammeter 59 and a switch 60. A voltmeter 61 may be connected across the conductors 55, 56 and so also may an incandescent lamp 62 whereby the operator will know when the current is on.

Referring to the lower part of Figure 1, in the interior of the porcelain insulator 52 is a thermocouple 63. Conductors 64 and 65 connect the thermocouple 63 to the rings 26 and 27. Outside conductors 67 and 68 connect the brushes 30 and 31 to an ammeter 70. This ammeter 70 measures the temperature of the heating unit which comprises the porcelain insulator 42 wound with the resistance wire 51.

Around the heating unit aforesaid is a hollow cylindrical lapping element 75. This may be of any metal which is readily charged with abrasive. The upper portion of the lap 75 has an internally threaded taper bore 76. The lower end of the spindle 19 is slabbed off to form an expanding collet 77 having taper sides 78 which may be engaged by a taper collar 79 in screw threaded engagement with the spindle 19. When the collar 79 is screwed downwardly, the collet 77 is compressed so that the tool 75 may be removed. A protecting snap cover 80 may be provided for the lower end of the porcelain 42, fitting in the bore of the lapping tool 75.

In order to prevent rotation of the brushes 28, 29, 30 and 31, the upper part of the insulating rod 32 is attached to a metal rod 82 which passes through a bore in the stationary journal portion 10 of the drill press. This rod may move up and down in the portion 10 as the tool is used. A suitable casing 85 of insulating material may be provided to cover the rings 24 to 27, the brushes 28 to 31, and adjacent parts of the apparatus, as shown.

Referring now to Figure 4, the operator first sprinkles the lapping powder to be used on a steel plate 86 and rolls the lap 75 in this powder. Any suitable abrasive may be used, for example alumina in its various forms, including electric furnace fused alumina, emery and corundum, also silicon carbide or other hard carbides including boron carbide. Preferably for lapping certain hard steels, diamond dust may be used. When the tool 75 has been rolled in the powder for a short period, it is charged with abrasive and then the tool may be assembled as shown in Figure 1. By means of the switch 60 and rheostat 58, the operator heats the tool which he first lowers into the work piece, using the hand wheel or lever of the drill press, not shown. The operator may then reciprocate the tool vertically in the bore of the work piece while it rotates therein. The controls should be used to heat the tool up gradually. As the tool heats, it expands and, therefore, becomes of greater diameter. Its size is proportional to the temperature and the temperature can be deduced from the reading of the ammeter 70 which, in fact, may be calibrated in terms of temperature or even in terms of hundred thousandths of an inch above or below a certain standard diameter.

With this apparatus very delicate lapping operations can be performed, since a few degrees' rise of temperature involves an exceedingly small increase in diameter of the lapping tool. The operation can be carried on rapidly since the tool 75 will heat up rapidly when the rheostat 58 is operated and when the current is cut off, the tool cools down rapidly owing to the fact that it is made of metal. Also, it can be removed from the bore of the work piece and the rotary motion thereof sets up air friction which rapidly cools the tool. Lapping operations which always have involved a good deal of time may thus be carried out according to the present invention relatively expeditiously.

The object to be lapped will usually comprise a piece of steel of some size which may be held in a suitable clamp or holder, not shown. This may also be of metal and thus heat will be rapidly conducted away from the object to be lapped. Various expedients may be adopted for the cooling of the object to be lapped, if desired, such as the use of a stream of water which need not be directed into the bore to be lapped but only against the outside of the article. In this manner, control over the lapping operation can more readily be effected. Also, an air jet can be used and is very effective to prevent the object being lapped from heating up due to the heat from the lap.

It will thus be seen that there has been provided by this invention an apparatus and a method in which the various objects hereinabove set forth together with many thoroughly practical advantages are successfully achieved. As many possible embodiments may be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

I claim:

1. The method of lapping to fine precision limits the bore of an article with an internal lapping tool substantially fitting the bore which comprises heating the tool from the inside thereof while in the bore of the article, and moving the tool in the bore while it is heated.

2. The method of lapping to fine precision limits the bore of an article with an internal lapping tool substantially fitting the bore which comprises heating the tool from the inside thereof while in the bore of the article, moving the tool in the bore while it is heated, and determining the temperature of the lapping tool from time to time to gauge the lapping operation.

3. The method of lapping to fine precision limits the bore of an article with an internal lapping tool substantially fitting the bore which comprises heating the tool from the inside while in the bore of the article, moving the tool in the bore while it is heated, and at the same time cooling the article to an extent sufficient to prevent large rise of temperature thereof.

4. The method of lapping to fine precision limits the bore of an article with an internal lapping tool substantially fitting the bore which comprises heating the tool from the inside while rotating it in the bore of the article, at the same time cooling the article to an extent sufficient to prevent large rise of temperature thereof, and determining the temperature of the lapping tool from time to time to gauge the lapping operation.

5. Lapping apparatus including a cylindrical lapping tool rotatably mounted having a cylindrical lapping surface fitting the bore of a work piece, electric resistance wire in the inside of said tool, electric connections including rings and brushes to pass electric current through the resistance wire, thereby to heat the tool, and means to measure the temperature of the tool, thereby accurately to control a lapping operation.

6. Lapping apparatus including a cylindrical lapping tool rotatably mounted having a cylindrical lapping surface fitting the bore of a work piece, electric resistance wire in the inside of said tool, electric connections including rings and brushes to pass electric current through the resistance wire, thereby to heat the tool, and a couple in the tool to measure the temperature thereof.

7. Lapping apparatus including a cylindrical lapping tool rotatably mounted having a cylindrical lapping surface fitting the bore of a work piece, electric resistance wire in the inside of said tool, electric connections including rings and brushes to pass electric current through the resistance wire, thereby to heat the tool, a couple in the tool to measure the temperature thereof, electric connections including rings and brushes to take the current generated by the couple outside of the tool, and an ammeter to measure the last mentioned current in order to determine the temperature of the tool and thereby its size.

HERBERT S. INDGE.